(12) United States Patent
DePaola et al.

(10) Patent No.: US 10,357,023 B2
(45) Date of Patent: Jul. 23, 2019

(54) APPARATUS FOR SHELLFISH AQUACULTURE

(71) Applicants: Angelo DePaola, Coden, AL (US); Gary Sunderland, Surf City, NC (US)

(72) Inventors: Angelo DePaola, Coden, AL (US); Gary Sunderland, Surf City, NC (US)

( * ) Notice: Subject to any disclaimer, the term of this patent is extended or adjusted under 35 U.S.C. 154(b) by 210 days.

(21) Appl. No.: 15/443,563

(22) Filed: Feb. 27, 2017

(65) Prior Publication Data
US 2017/0245479 A1   Aug. 31, 2017

Related U.S. Application Data

(60) Provisional application No. 62/299,859, filed on Feb. 25, 2016.

(51) Int. Cl.
| | |
|---|---|
| *A01K 61/60* | (2017.01) |
| *A01K 61/50* | (2017.01) |
| *A01K 61/55* | (2017.01) |
| *B63B 13/00* | (2006.01) |
| *B63B 35/38* | (2006.01) |

(52) U.S. Cl.
CPC .............. *A01K 61/60* (2017.01); *A01K 61/50* (2017.01); *A01K 61/55* (2017.01); *B63B 13/00* (2013.01); *B63B 35/38* (2013.01); *B63B 2207/02* (2013.01); *B63B 2207/04* (2013.01)

(58) Field of Classification Search
CPC ......... A01K 61/60; A01K 61/55; A01K 61/50
See application file for complete search history.

(56) References Cited

U.S. PATENT DOCUMENTS

| | | | | |
|---|---|---|---|---|
| 2,283,472 A | * | 5/1942 | Tuxhorn ................ | A01K 61/60 119/223 |
| 5,337,516 A | * | 8/1994 | Hondulas .............. | A01G 31/02 210/602 |

FOREIGN PATENT DOCUMENTS

| | | | | |
|---|---|---|---|---|
| CA | 2491709 A1 | * | 1/2004 | ............. A01K 61/54 |
| DE | 102012011283 A1 | * | 12/2013 | ............. A01K 61/60 |
| WO | WO-2013182188 A1 | * | 12/2013 | ............. A01K 61/60 |

* cited by examiner

*Primary Examiner* — Kristen C Hayes
(74) *Attorney, Agent, or Firm* — AdamsIP, LLC; James Adams; Stephen Thompson (57) ABSTRACT

A pneumatically controlled shellfish aquaculture apparatus is provided. A frame has containers for holding shellfish secured to the top side of the frame and tanks secured to the bottom side of the frame. Each tank has an air supply line connected to the tank and an opening on the bottom side of the tank. Each air supply line is connected to a manifold for controlling airflow to the tanks. Air is used to displace water in the tanks by pushing the water out of the openings in the bottom of the tanks in order to float the frame. To submerge the frame, the tanks are depressurized to allow water to displace the air in the tanks. When floating, the tanks lift the frame and the containers out of the water to allow air desiccation in order to prevent bio-fouling of the equipment and shellfish.

19 Claims, 7 Drawing Sheets

FIG. 8

APPARATUS FOR SHELLFISH AQUACULTURE

CROSS REFERENCES

This application claims the benefit of U.S. Provisional Application No. 62/299,859, filed on Feb. 25, 2016, which application is incorporated herein by reference.

FIELD OF THE INVENTION

The present invention refers generally to a shellfish aquaculture apparatus and, more specifically, to a pneumatically controlled apparatus for shellfish aquaculture.

BACKGROUND

It is estimated that over 90% of oysters, clams, and mussels produced for consumption worldwide come from aquaculture farms. In particular, due to loss of wild oyster reefs, small-scale aquaculture of oysters has increased significantly in recent years. Typical shellfish aquaculture farms utilize baskets, cages, trays, racks, or similar containers for holding the oysters either on the water bottom or off-bottom. The oysters and aquaculture equipment remain submerged in natural water bodies for extended periods of time during the growth of the oyster to a matured state suitable for harvest. During submerged periods, a biofilm of microorganisms may form on outer surfaces of the shellfish and the submerged aquaculture equipment, which can lead to the attachment of nuisance bio-fouling organisms such as barnacles and unwanted bivalve shellfish. Bio-fouling organisms create nuisance by clogging mesh or pores in shellfish containers, which reduces water flow through the containers and food availability for the shellfish, thereby slowing growth of culture shellfish. Additionally, bio-fouling organisms attach directly to shellfish causing visual defects that reduce market value. Unwanted organisms also add excessive weight to the system and can damage moving parts of the aquaculture equipment. Periodic emergence of the equipment and shellfish in the air above the sea surface for about 24 hours desiccates the biofilm before it sufficiently establishes to permit attachment of bio-fouling organisms. Emergence of the equipment eliminates the need to pressure wash or clean equipment and shellfish by other means after bio-fouling organisms colonize the exposed surfaces.

In productive shellfish growing areas such as the Gulf of Mexico, desiccation of gear at weekly intervals is typically required to control bio-fouling. Currently employed methods for bio-fouling control rely on intensive and potentially unsafe manual labor practices. Typical aquaculture systems comprise rectangular containers constructed of heavy plastic coated wire mesh that are assembled with multiple container compartments for holding flexible plastic mesh bags of varying mesh sizes that contain shellfish at various growth stages. The containers typically have two air-filled floats attached to the top of the containers on the outside edges on opposing sides to maximize stability to wave action. The air-filled floats provide adequate buoyancy to float the oyster-filled containers below the surface of the water for growing the oysters. The normal bio-fouling practice employed with floating aquaculture systems is to manually flip the containers upside down so the floats are on the bottom of the containers. Float buoyancy elevates the oysters and the containers in the air above the water surface. In shallow areas, flipping the containers is often done by wading, but boats are required to work deeper or colder waters. Relatively calm waters are required to flip the containers from boats. After a desiccation period of about 24 hours, the containers are manually flipped back into the growth position until the next desiccation treatment. This method of bio-fouling control is labor intensive and time consuming, which drives up oyster production costs. In addition, there are safety risks involved with the manual flipping of the oyster-filled containers, which can be extremely heavy. To limit the weight, smaller containers or groups of containers must be utilized, thereby limiting the potential scale of an operation.

Accordingly, a need exists in the art for a shellfish aquaculture apparatus and method that allows for simple, fast, and safe bio-fouling control.

SUMMARY

The shellfish aquaculture apparatus of the present disclosure automates air desiccation of bivalve shellfish produced in off-bottom containerized aquaculture systems for the purposes of controlling bio-fouling on the surfaces of the shellfish and aquaculture equipment. In one aspect, a pneumatically controlled apparatus for shellfish aquaculture comprises containers secured to a top side of a frame and a plurality of tanks secured to a bottom side of the frame. In a preferred embodiment, the frame is rectangular and has a front end and a rear end. The apparatus preferably comprises four tanks positioned at the corners of the frame. Two front tanks are positioned at the corners of the front end, and two rear tanks are positioned at the corners of the rear end. Each tank has an air supply line connected to the tank and an opening located on a bottom side of the tank. Each air supply line may be connected to a manifold for supplying air to each tank. The manifold has a connection nozzle for a primary air supply line from an air source. The air source is preferably a pressurized tank, such as a SCUBA tank, or an air compressor. The manifold has valves for individually controlling the flow of air to each of the tanks.

The shellfish aquaculture apparatus is configured for use in two positions: a floating position and a submerged position. The tanks are filled with air when in the floating position and with water when in the submerged position. When in the floating position, the containers and shellfish contained therein are lifted above the surface of the water. The containers and shellfish can be held in this position for a period of time sufficient to allow air desiccation in order to prevent the formation of biofilm on the containers and shellfish, which is a precursor to bio-fouling by barnacles or other unwanted organisms. Other shellfish husbandry activities such as stocking containers, size-sorting shellfish, grading, inspections to monitor the growth and quality of the stock, and harvesting are also facilitated while the apparatus is in the floating position. Additionally, the apparatus can be disconnected from moorings and towed away to avoid hazards or towed to a more favorable location for growth or acquisition of quality growth characteristics such as salinity. When in the submerged position, the tanks rest on the water bottom and hold the containers and shellfish contained therein off the water bottom to allow shellfish growth before harvesting.

To move the apparatus from the submerged position to the floating position, air is supplied to the tanks in order to displace the water in the tanks. The air supply lines are preferably connected to the top side of each tank, and pressurized air supplied via the lines displaces the water in the tanks by pushing the water out of each respective opening located on the bottom side of each tank. As the water is displaced by air, the apparatus will rise to the surface of the water. When substantially all of the water in each tank has been displaced by air, the apparatus will float on the surface of the water such that the containers and shellfish contained therein are above the water surface.

In a preferred embodiment, the process of filling the tanks with air to displace the water is done in two steps. First, air is supplied only to the two front tanks, which causes the front end of the frame to float while the rear end of the frame rests on the water bottom. Next, air is supplied to the two rear tanks in order to float the rear end of the frame. The entire frame will then float and remain in the floating position as long as air pressure is maintained in the tanks. Filling the front and rear tanks with air sequentially improves the stability of the apparatus and reduces the risk of flipping the frame and the containers holding shellfish during the process of filling the tanks with air to float the frame. The process of floating the apparatus is repeated each time bio-fouling treatment is required.

Once bio-fouling treatment is complete, the apparatus may be returned to the submerged position by sequentially depressurizing the front and rear tanks in reverse order from that used to float the apparatus. Once the air pressure is removed from the rear tanks, the weight of the apparatus will cause water to displace the air in the rear tanks by entering the openings located on the bottom side of each of the rear tanks. The rear end of the frame will then sink and rest on the water bottom to provide stability to the frame. Next, the front tanks are depressurized to displace the air in the front tanks with water. The front end will then sink to the water bottom, and the apparatus will be in the submerged position.

The apparatus of the present disclosure is advantageous compared to known shellfish aquaculture systems because it eliminates the time consuming manual labor involved with flipping containers for desiccation. Because containers are not flipped manually, the capacity of a unit of containers can be increased substantially, typically from less than 1,000 shellfish to greater than 10,000 shellfish. The apparatus also reduces risks associated with manual flipping, such as falls, drowning, hypothermia, wound infections, stings or bites from jellyfish or other sea animals, or other similar risks.

Accordingly, one object of the present invention is to provide a shellfish aquaculture apparatus having pneumatic flotation control for sinking and floating the apparatus in order to facilitate all phases of shellfish production and harvest. Another object of the present invention is to provide a method of bio-fouling treatment that does not require shellfish containers to be flipped.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
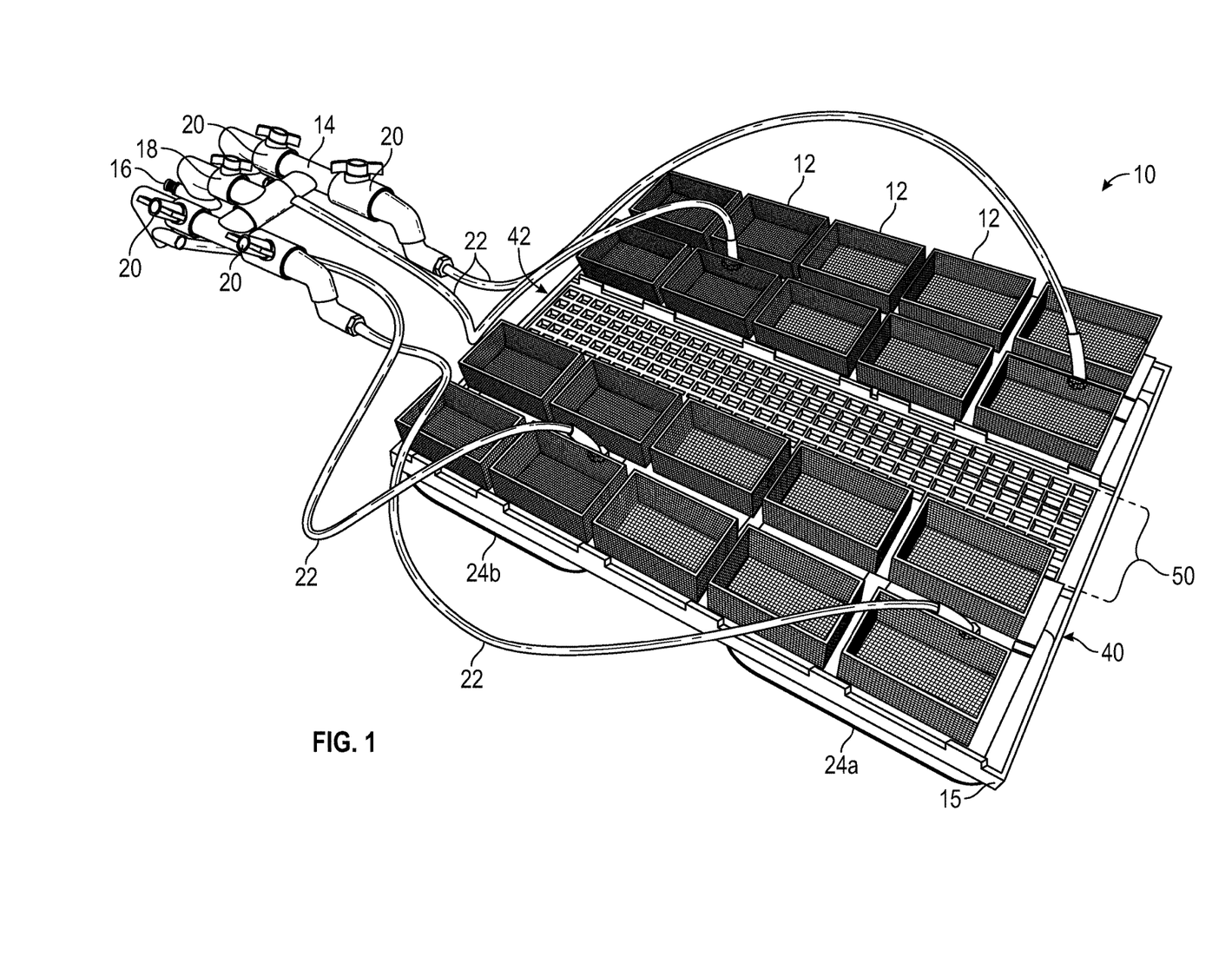
FIG. 1 is a top perspective view of a shellfish aquaculture apparatus in accordance with the present disclosure.
Figure 2:
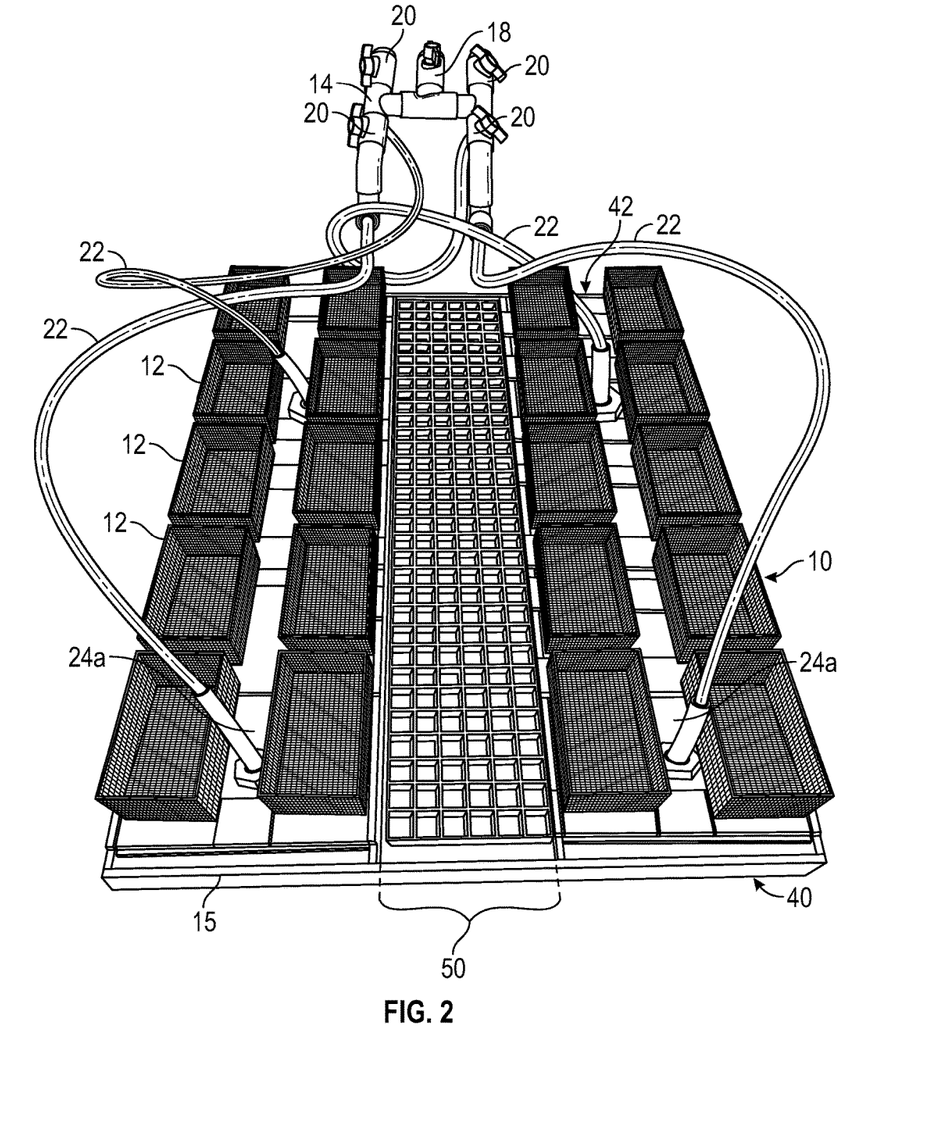
FIG. 2 is a top perspective view of a shellfish aquaculture apparatus in accordance with the present disclosure.
Figure 3:
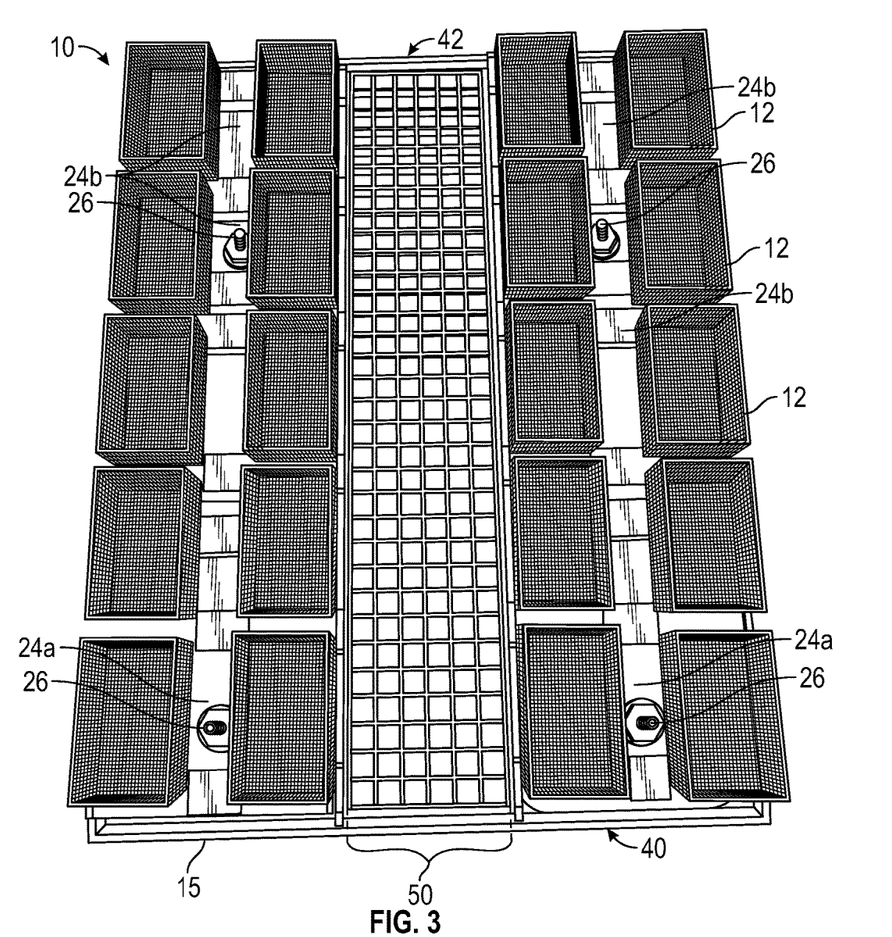
FIG. 3 is a top perspective view of a shellfish aquaculture apparatus in accordance with the present disclosure.

Turning now to the drawings, FIGS. 1-7 illustrate preferred embodiments of a pneumatically controlled apparatus for shellfish aquaculture in accordance with the present disclosure. As shown in FIG. 1, the apparatus comprises a frame 15 having a top side and a bottom side. The frame 15 has at least one container 12 secured to the top side of the frame 15, and preferably has a plurality of containers 12 arranged in rows, as shown in FIG. 1. The containers 12 are designed for holding shellfish such as oysters, clams, or mussels for aquaculture. The containers 12 have a bottom and a continuous sidewall having a plurality of holes therethrough to allow water to flow through the containers 12. As illustrated in FIGS. 1-3, the containers 12 are preferably mesh baskets 12. The mesh is small enough to contain shellfish but large enough to allow sufficient amounts of water to flow through the baskets to provide an adequate food supply for the shellfish. The containers 12 may also comprise an enclosed basket or cage having a top that can be opened to access the shellfish or closed to keep out predators when the apparatus is in use. Containers 12 may also be stacked vertically in order to increase shellfish growing capacity. Stacked containers may be secured to adjacent containers or alternatively to a vertical rod, brackets, or similar support structure secured to the frame 15 of the apparatus to hold the containers in place. The containers 12 may be secured to the frame 15, to other containers, or to any other support structure utilizing any suitable fastener, including, but not limited to, nuts and bolts, clips, rope, or wire. Each container 12 may be bolted to the frame 15 through the holes in the mesh of the container.

The plurality of containers 12 secured to the frame 15 make up a unit 10 of containers 12 for farming shellfish. The unit 10 as shown in FIGS. 1-3 comprises twenty individual containers 12 arranged in four rows of five containers 12 each and has a center walkway 50 to accommodate an on-board worker. This embodiment is illustrative only, and it should be understood that the present invention may comprise any number of containers arranged in any manner, including stacking the containers vertically. Alternatively, the frame 15 itself may function as a container by adding a raised sidewall around the perimeter of the frame.

Figure 5:
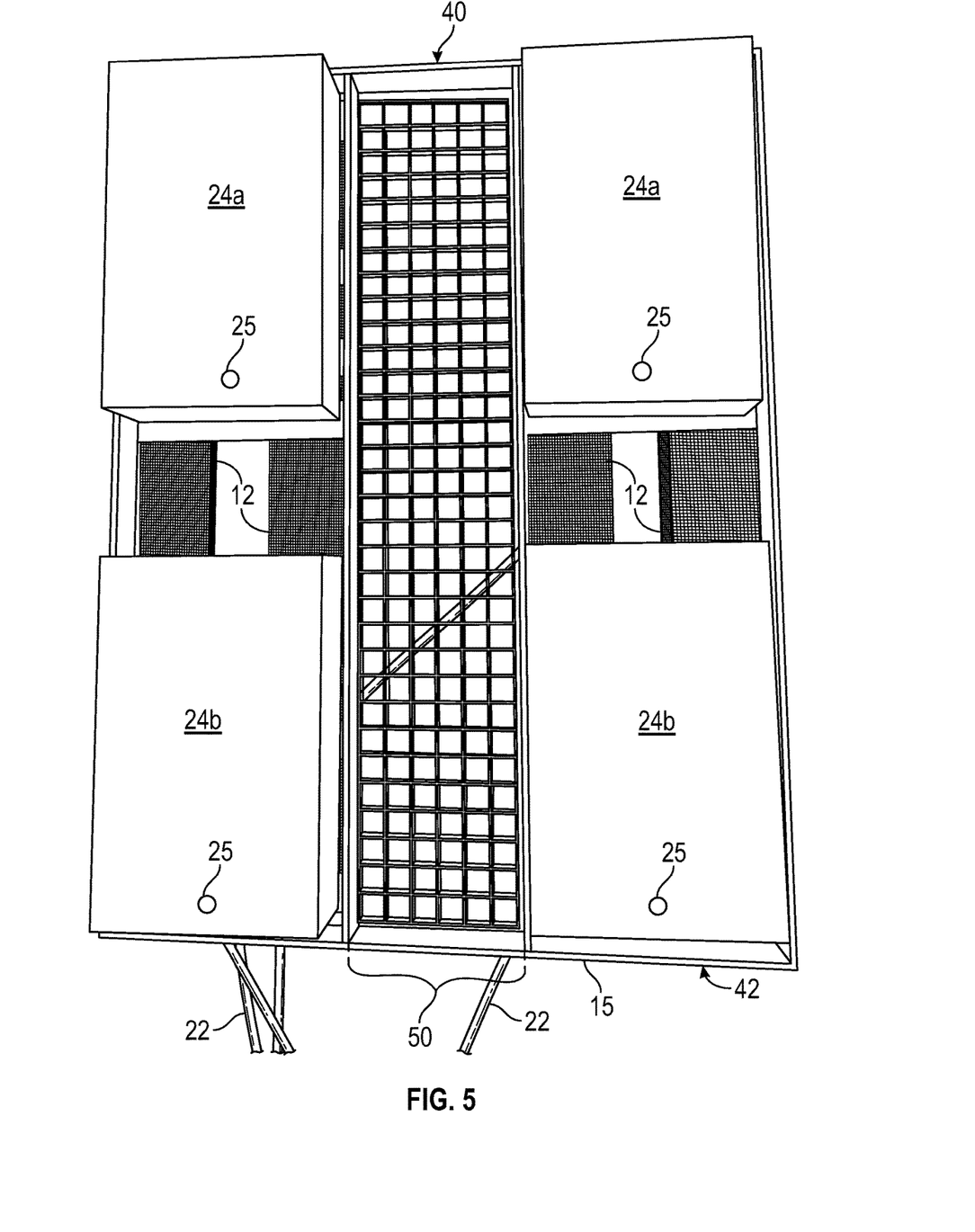
FIG. 5 is a bottom perspective view of a shellfish aquaculture apparatus in accordance with the present disclosure.

At least one tank 24 is secured to the bottom side of the frame 15, and preferably a plurality of tanks 24 are secured to the frame 15. FIG. 5 shows a bottom view of the apparatus and illustrates a preferred configuration of the tanks 24. In a preferred embodiment, the frame 15 is generally rectangular and has four tanks 24 secured to the bottom side of the frame 15. The frame 15 has a first end and a second end, referred to herein as a front end 40 and a rear end 42, which are preferably the short sides of the rectangular frame 15. The apparatus preferably comprises four tanks 24 positioned at the corners of the frame 15. Two front tanks 24a are positioned at the corners of the front end 40, and two rear tanks 24b are positioned at the corners of the rear end 42. As used herein, reference number 24 refers to all tanks generally, and reference numbers 24a and 24b refer specifically to the front tanks and rear tanks, respectively.

The tanks 24 may be secured to the frame 15 utilizing any suitable fastener, including, but not limited to, nuts and bolts, clips, rope, or wire. Each tank 24 may optionally have eyes attached to the exterior of the tank and positioned such that the eyes may be used to bolt the tank 24 to the frame 15.

Each tank 24 has a connection configured for connecting a fluid supply line thereto. In a preferred embodiment, the connection is a nozzle 26 to which a flexible air supply line 22 may be connected for supplying air to each tank 24. Each tank 24 has a top side and a bottom side, and the nozzle 26 is preferably located on the top side of each tank 24, as shown in FIG. 3, for connecting the air supply line 22 to the top of the tank 24. Each tank 24 also has an opening 25 located on the bottom side of the tank 24, as shown in FIG. 5. The opening 25 allows water to fill the tank 24 to displace air in the tank 24. The opening 25 is preferably offset from the center of the bottom of the tank 24, as shown in FIG. 5. In addition, the air supply nozzle 26 is preferably offset from the center of the top of the tank 24, as best seen in FIGS. 1-3. In a preferred embodiment, the opening 25 and the nozzle 26 of each tank 24 are offset in opposite directions. For instance, the opening 25 on the bottom side of each tank 24 may be positioned nearer to the rear end 42 of the frame 15, as shown in FIG. 5, and the nozzle 26 on the top side of each tank 24 may be positioned nearer to the front end 40 of the frame 15, as seen in FIG. 1. This configuration may assist in the floating and sinking of the apparatus, as discussed below.

Preferably, each air supply nozzle 26 comprises a bulkhead hose barb fitting located on the top centerline of each tank 24 about 12 inches from the front end of the tank 24. Each of the openings 25 is preferably about two inches in diameter and located on the bottom centerline of each tank 24 about six inches from the rear end of the tank 24. As used herein, the "front end of the tank" refers to the end of each tank 24 nearer to the front end 40 of the frame 15, and the "rear end of the tank" refers to the end of each tank 24 nearer to the rear end 42 of the frame 15.

Figure 4:
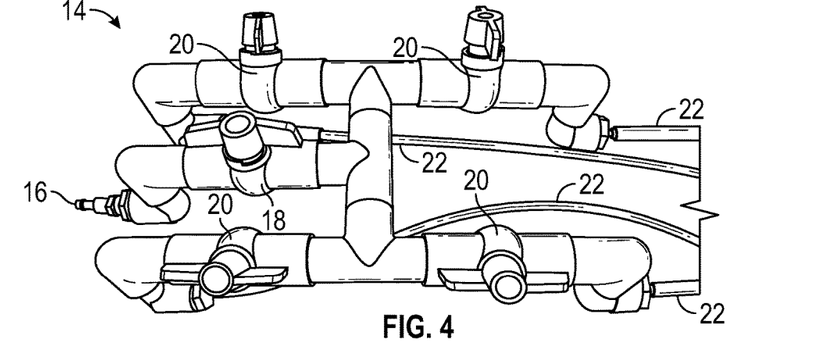
FIG. 4 is a perspective view of a manifold for use with a shellfish aquaculture apparatus in accordance with the present disclosure.

Preferably, the apparatus further comprises a manifold 14 configured for individually controlling the flow of air to each of the tanks 24 via the air supply lines 22 connected to each air supply nozzle 26, as shown in FIGS. 1-2. FIG. 4 shows a detailed view of the manifold 14. The manifold 14 and supply lines 22 shown in FIGS. 1-2 and FIGS. 6-7 may not be to scale and may be shown in a larger size with respect to the unit 10 of containers 12 for ease of illustration. In a preferred embodiment, the supply lines 22 may be standard one-quarter inch (¼") diameter pneumatic air hoses.

Figure 6:
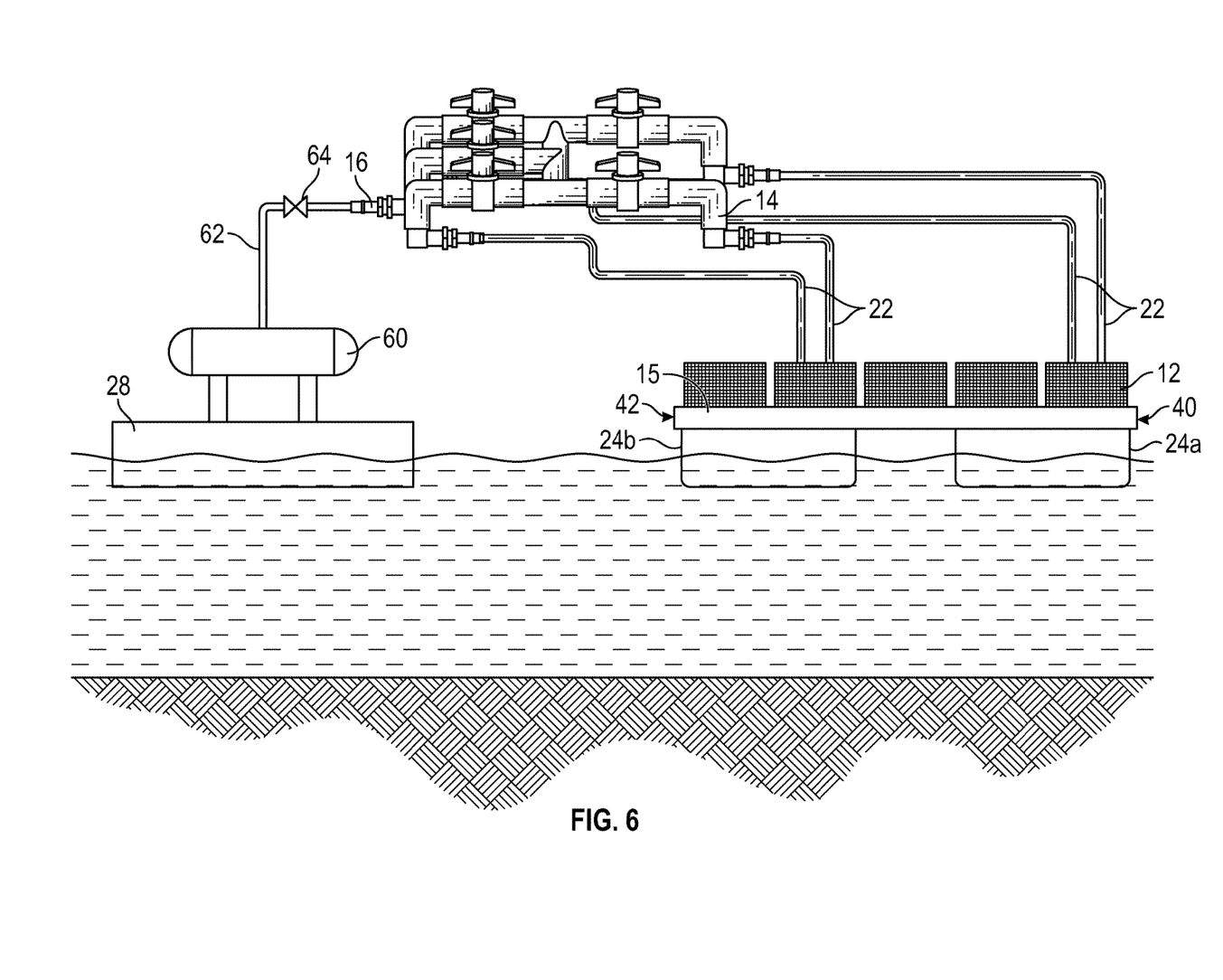
FIG. 6 is a side view of a shellfish aquaculture apparatus being used in accordance with the present disclosure.
Figure 7:
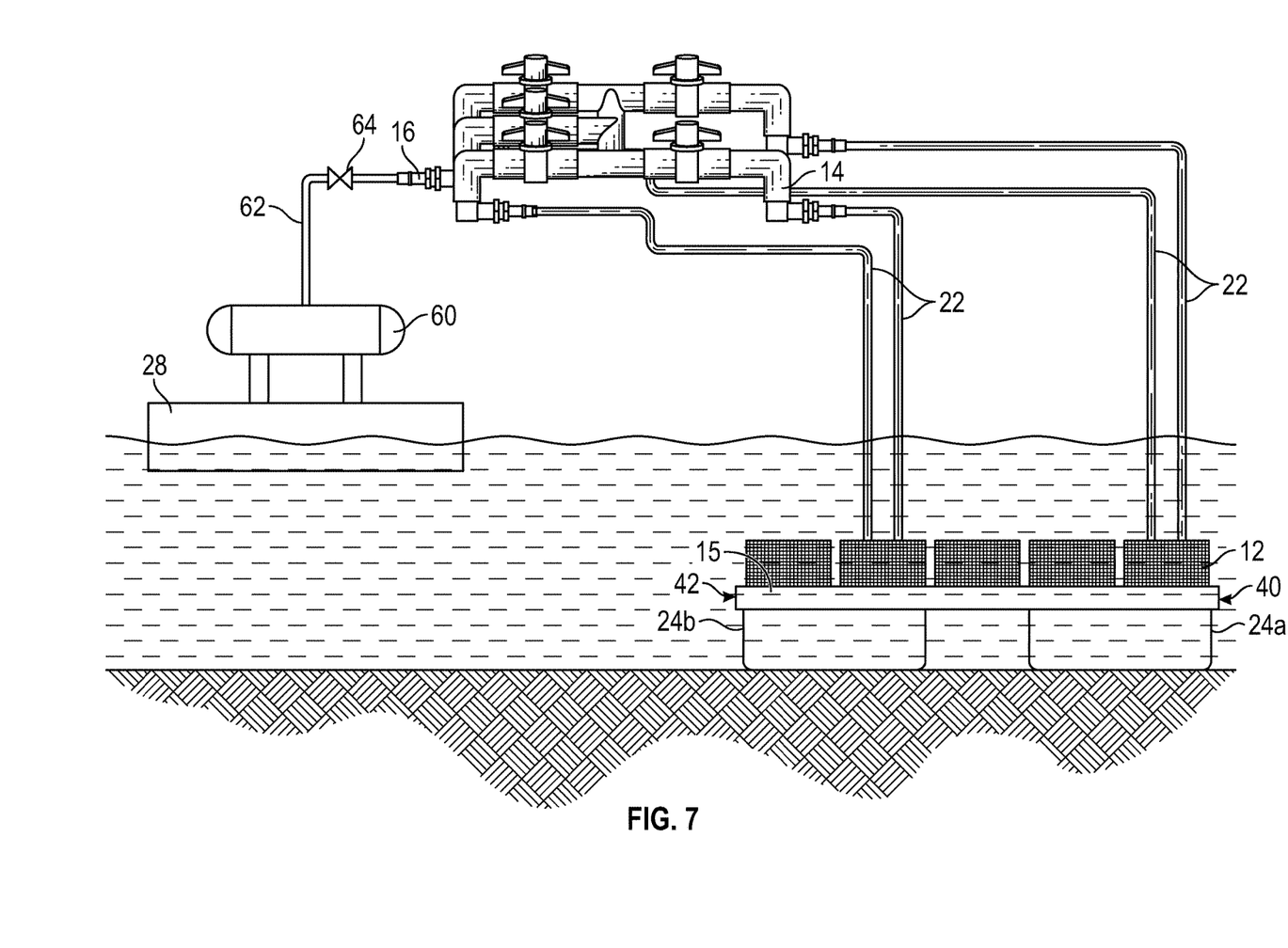
FIG. 7 is a side view of a shellfish aquaculture apparatus being used in accordance with the present disclosure.

The shellfish aquaculture apparatus is configured for use in two positions: the floating position and the submerged position. The tanks 24 are filled with air when in the floating position, as shown in FIG. 6, and with water when in the submerged position, as shown in FIG. 7. When in the floating position, the containers 12 and the shellfish contained therein are lifted above the surface of the water. The containers 12 and shellfish can be held in this position for a period of time sufficient to allow air desiccation in order to prevent the formation of biofilm on the containers 12 and shellfish, which is a precursor to bio-fouling by barnacles or other unwanted organisms. Other shellfish husbandry activities such as stocking containers, sorting shellfish by size, and harvesting are also facilitated while the apparatus is in the floating position. Additionally, the apparatus can be disconnected from moorings and towed away to avoid hazards or towed to a more favorable location for growth or acquisition of quality growth characteristics such as salinity. When in the submerged position, the tanks 24 rest on the water bottom and hold the containers 12 and shellfish contained therein off the water bottom to allow shellfish growth before harvesting.

As shown in FIG. 4, the manifold 14 has a connection nozzle 16 for a primary air supply line 62 from a compressed air source 60 and a primary air supply valve 18. The air source 60 is preferably a pressurized tank, as shown in FIGS. 6-7, which may be a SCUBA tank. The air source 60 may alternatively be an air compressor. The air source 60 may have a supply line 62 and associated valve 64 for shutting off airflow when connecting the air source 60 to the manifold 14. The primary air supply valve 18 allows a user to isolate the compressed air source 60 from the manifold 14 by closing the valve 18 or to supply compressed air to the manifold 14 by opening the valve 18. The manifold further comprises a plurality of valves 20 for individually controlling the flow of air to each of the tanks 24. By supplying compressed air to the manifold 14 and opening a valve 20, an air supply line 22 will supply compressed air to a corresponding tank 24. If the tank 24 contains water, the water will be displaced by the air and pushed out of the opening 25 on the bottom side of the tank 24. The displacement of the water by air will cause the tank 24 to float. Displacing the water with air in all of the tanks 24 will float the entire frame 15 and the containers 12 secured thereto.

To move the apparatus from the submerged position, in which the tanks 24 are filled with water, to the floating position, air is supplied to the tanks 24 in order to displace the water in the tanks 24 with air. The displacement of water with air floats the frame 15 and the containers 12 secured thereto, as shown in FIG. 6. First, a primary air supply line 62 is connected to the connection nozzle 16 on the manifold 14 for supplying compressed air to the tanks 24. The valves 20 on the manifold 14 for controlling airflow to each of the tanks 24 are closed before opening the primary air supply valve 18 to supply compressed air to the manifold 14. Next, each of the valves 20 is opened to supply compressed air to each tank 24 via the air supply lines 22. As the pressurized air enters through the nozzle 26 on each tank 24, the air displaces the water in the tanks 24 by pushing the water out of each respective opening 25 located on the bottom side of each tank 24. As the water is displaced by air, the frame 15 and shellfish containers 12 will rise to the surface of the water. When the water has been substantially displaced by air in each of the tanks 24, the apparatus will float on the surface of the water such that the containers 12 and shellfish contained therein are above the water surface, as shown in FIG. 6.

In a preferred embodiment, the process of filling the tanks 24 with air to displace the water is done in two steps. First, the two front tanks 24a are filled with air by opening the valves 20 for the supply lines 22 connected to the front tanks 24a. This step will cause the front end 40 of the frame 15 to float while the rear end 42 of the frame 15 rests on the water bottom. Next, the two rear tanks 24b are filled with air by opening the valves 20 for the supply lines 22 connected to the rear tanks 24b in order to float the rear end 42 of the frame 15. Once the entire frame 15 is in the floating position, as shown in FIG. 6, all of the valves 20 for the air supply lines 22 may be closed, and the frame 15 will remain in the floating position. Sequentially filling the front 24a and rear tanks 24b with air improves the stability of the apparatus and reduces the risk of flipping the frame 15 and the containers holding shellfish during the process of filling the tanks 24 with air to float the frame 15. The process of floating the apparatus is repeated each time bio-fouling treatment is required.

As shown in FIGS. 1-2, the front end 40 and the rear end 42 preferably correspond to short sides of the rectangular frame 15. Sequentially filling the front tanks 24a followed by the rear tanks 24b on the short sides of the frame 15 improves the stability of the frame 15 when floating or submerging the apparatus. The long sides of the frame 15 are preferably long enough so that the rear end 42 can rest on the water bottom when the front end 40 is floating on the water surface, which provides stability to the frame 15 when floating or sinking the frame. Thus, it is preferable to float each end of the frame in a sequential manner. Because the openings 25 on the bottom side of each front tank 24a are positioned nearer to the rear end of each front tank 24a, the amount of water displaced by air in the front tanks 24a is increased by first floating the front end 40 of the frame 15 while the rear end 42 rests on the water bottom. For the same reason, the openings 25 on the bottom side of each rear tank 24b are also positioned nearer the rear end of the rear tanks 24b. Once both ends of the frame 15 are floated, tanks 24a and 24b are generally level, which allows substantially all of the water in both sets of tanks 24a, 24b to be displaced by air.

Once bio-fouling treatment is complete, the apparatus may be returned to the submerged position by sequentially depressurizing the front tanks 24a and the rear tanks 24b in reverse order from that used to float the apparatus. First, the compressed air supply 60 is disconnected from the manifold 14 and the primary air supply valve 18 is opened to provide a pressure relief point to relieve air pressure to the atmosphere. Next, the valves 20 for the supply lines 22 connected to the rear tanks 24b are opened to depressurize the rear tanks 24b. Once the air pressure is removed from the rear tanks 24b, the weight of the apparatus will cause the rear end 42 of the frame to sink, and water will enter the openings 25 located on the bottom side of each of the rear tanks 24b until the air in the rear tanks 24b has been substantially displaced by water. The rear end 42 will then rest on the water bottom, thereby providing stability to the frame 15. Next, the valves 20 for the front end tanks 24a are opened to depressurize the front tanks 24a and displace the air in the front tanks 24a with water. The front end 40 will then sink to the water bottom, and the apparatus will be in the submerged position, as shown in FIG. 7.

Figure 8:
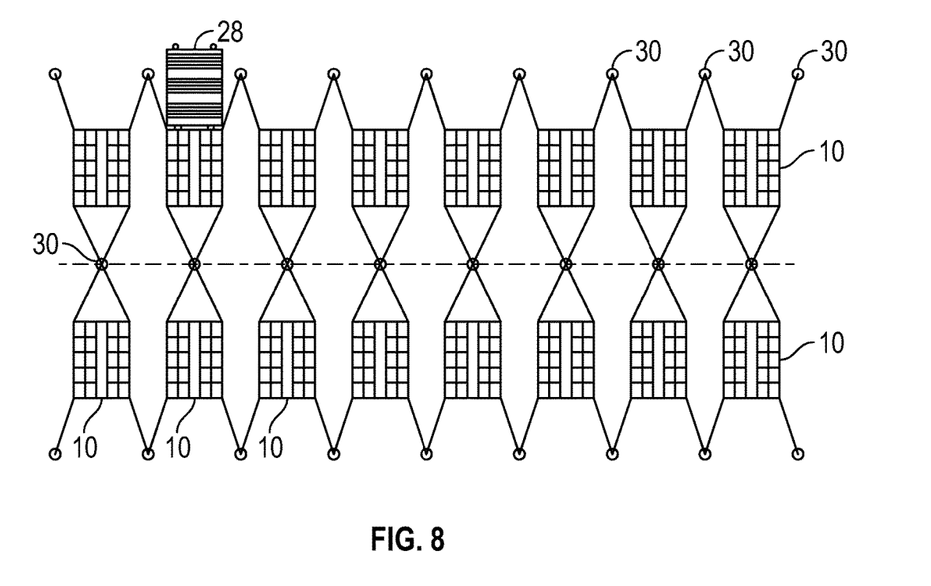
FIG. 8 is a top plan view of a plurality shellfish aquaculture apparatuses being used in accordance with the present disclosure.

FIGS. 1-3 illustrate a single unit 10 of shellfish containers 12 for ease of illustration. As shown in FIG. 8, a plurality of individual units 10 may be utilized to scale up a shellfish aquaculture operation. FIG. 8, which shows sixteen individual units 10, is illustrative only, and the number of units 10 may be increased or decreased according to the desired capacity of the operation. In addition, the 2-by-8 arrangement of units 10 shown in FIG. 8 is illustrative only. The units 10 may be arranged in any suitable configuration designed to maximize shellfish growth. In a preferred embodiment, the units 10 of containers 12 are tethered to a structure such as pilings 30 driven into the water bottom so that each unit 10 can be moved between the floating and the submerged positions while remaining tethered. In alternative embodiments, temporary stakes, posts, or similar tethering structures may be used. In addition, any suitable anchoring devices, such as a conventional anchor, may be utilized to secure units in a location. Units 10 may also be tethered to piers, decks, or similar structures. For instance, existing piers may be utilized for shellfish production by installing multiple units 10 along the length of the pier.

Each individual unit 10 preferably has its own dedicated manifold 14 for supplying compressed air to the tanks 24 of the unit 10. In a preferred embodiment, the manifold 14 for each unit is stored above the surface of the water, and the air supply lines 22 are sufficiently long enough to extend down to the tanks 24 when a unit 10 is in the submerged position. Each manifold 14 may have a float connected to it so that the manifold 14 floats above its unit 10, or alternatively each manifold 14 may be tied or otherwise secured to a piling 30 or other structure to store the manifold 14 out of the water when not in use. When using the apparatus, the front end 40 of the frame 15 is preferably positioned such that it is facing the prevailing seas, and the manifold 14 is preferably positioned at the rear end 42 of the frame 15 for ease of use.

FIGS. 6-8 illustrate a floating barge 28 or boat adjacent to a unit 10 of containers 12. The barge 28 may be used to hold the air source, such as a compressed air tank 60 or a portable air compressor, so that a user can transport the source of compressed air to each unit 10 to float the unit for bio-fouling treatment. Alternatively, another suitable gaseous fluid, such as nitrogen, may be utilized. When desiccation is complete, which typically takes about 24 hours, the barge 28 may be used to allow the user to move from unit to unit to depressurize the tanks 24 via the manifolds 14 in order to return the units 10 to the submerged position for shellfish growth.

The top and bottom sides of the tanks 24 preferably have a generally rectangular shape, as seen in FIG. 5. This shape allows air pressure to be maintained inside the tanks 24 when the apparatus is in the floating position due to the openings 25 being positioned on the generally horizontal bottom side of each tank 24. The tanks 24 are sized such that they are sufficiently large enough to support the dead-load of the frame 15 and payload of containerized shellfish and have sufficient reserve buoyancy to raise the frame 15 and payload above the surface of the water body for desiccation. In addition, the tanks 24 are preferably large enough to lift the containers 12 and shellfish high enough out of the water to allow air desiccation during times of moderate wave action. This feature allows for timely, on-schedule air desiccation treatments, which reduces shellfish value losses due to bio-fouling defects. This feature also reduces additional gear cleaning and maintenance costs due to inadequate desiccation frequency, which can be caused by adverse weather conditions. Larger tanks 24 will also provide stability to the apparatus during moderate wave action and support the weight of an on-board worker. The worker can utilize the center walkway 50 between rows of containers 12 to perform various shellfish husbandry activities such as stocking containers, size-sorting shellfish, grading shellfish, inspections to monitor the growth and quality of the stock, and harvesting.

In one preferred embodiment, the frame 15 of each unit 10 is about twelve feet in width and about sixteen feet in length. In addition, each tank 24 is preferably about four feet by six feet by one foot (4'×6'×1'), with a volume of about 24 cubic feet. However, it should be understood that these dimensions may be varied according to the depth of the water, the desired shellfish capacity of the unit, and other factors.

The apparatus of the present disclosure is additionally advantageous compared to known shellfish aquaculture systems because it eliminates the time consuming manual labor involved with flipping containers. When manually flipping shellfish containers, the capacity of a unit of containers is generally limited to about one thousand average sized oysters due to weight consideration in a manual operation. The pneumatically controlled apparatus may be capable of handling units of shellfish containers holding significantly larger quantities and greater weights of shellfish. Utilizing larger production units reduces labor from handling smaller units, thereby increasing the capacity of the operation and reducing production costs. Larger units are also more resilient to severe weather and to theft. The apparatus also reduces risks associated with manual flipping, such as falls, drowning, hypothermia, wound infections, stings or bites from jellyfish or other sea animals, or other similar risks.

Additionally, the apparatus can be disconnected from moorings and towed away to avoid hazards or towed to a more favorable location for growth or acquisition of quality growth characteristics such as salinity. A unit of shellfish on board the apparatus can be relocated by floating the frame and towing it to a new area. The frame 15 will ride on the four floating tanks 24 as it is towed. Once there, anchors may be set and the apparatus can be submerged in a controlled manner as previously described. The ease of relocation of the apparatus is advantageous over other known shellfish aquaculture systems, which typically require towing submerged cages of shellfish, which is a time consuming process, or loading heavy cages of shellfish onto barges for transport.

It is understood that versions of the invention may come in different forms and embodiments. Additionally, it is understood that one of skill in the art would appreciate these various forms and embodiments as falling within the scope of the invention as disclosed herein.

What is claimed is:

1. A shellfish aquaculture apparatus, comprising:
a frame having a top side and a bottom side;
a container secured to the top side of the frame;
a tank secured to the bottom side of the frame, wherein the tank has a connection configured for connecting a fluid supply line thereto, and wherein the tank has an opening located on a bottom side of the tank; and
a compressed air source configured for supplying air to the tank via a fluid supply line connected to the connection on the tank.

2. The apparatus of claim 1, further comprising a valve configured to control the supply of air to the tank.

3. The apparatus of claim 1, further comprising a manifold configured to supply air to the tank.

4. The apparatus of claim 1, wherein the container has a bottom and a continuous sidewall, wherein the bottom and the sidewall have a plurality of holes therethrough.

5. The apparatus of claim 1, wherein the opening located on the bottom side of the tank is offset from the center of the tank.

6. The apparatus of claim 1, wherein the connection on the tank is located on a top side of the tank.

7. A shellfish aquaculture apparatus, comprising:
a frame having a top side and a bottom side;
at least one container secured to the top side of the frame;
a plurality of tanks secured to the bottom side of the frame, wherein each of the plurality of tanks has an opening located on a bottom side of each tank; and
a manifold configured to supply air to each of the plurality of tanks via an air supply line connected to each tank.

8. The apparatus of claim 7, wherein the frame has a generally rectangular shape, wherein the apparatus comprises four tanks, and wherein each tank is positioned at one corner of the frame.

9. The apparatus of claim 7, wherein the manifold comprises a plurality of valves configured to control the supply of air to each of the plurality of tanks.

10. The apparatus of claim 7, further comprising a compressed air source connected to the manifold.

11. The apparatus of claim 7, wherein the at least one container has a bottom and a continuous sidewall, wherein the bottom and the sidewall have a plurality of holes therethrough.

12. The apparatus of claim 7, wherein the opening located on the bottom side of each tank is offset from the center of the tank.

13. The apparatus of claim 7, wherein the air supply line connected to each tank is connected to a top side of each tank.

14. A method of controlling flotation of a shellfish aquaculture apparatus, said method comprising the steps of:
providing a shellfish aquaculture apparatus, comprising:
a frame having a top side and a bottom side;
at least one container secured to the top side of the frame;
a plurality of tanks secured to the bottom side of the frame, wherein at least one tank is positioned at a first end of the frame and at least one tank is positioned at a second end of the frame, wherein each of the plurality of tanks has an opening located on a bottom side of each tank; and
an air supply line connected to each of the plurality of tanks;
submerging the apparatus such that each of the plurality of tanks is filled with water;
supplying air to the at least one tank positioned at the first end of the frame such that the air displaces the water in the at least one tank by forcing the water out of the opening located on the bottom side of the at least one tank, thereby causing the first end of the frame to float while the second end of the frame remains submerged, and then
supplying air to the at least one tank positioned at the second end of the frame such that the air displaces the water in the at least one tank by forcing the water out of the opening located on the bottom side of the at least one tank, thereby causing the apparatus to float such that the container is held above the surface of the water.

15. The method of claim 14, further comprising the steps of:

removing air pressure from the at least one tank positioned at the second end of the frame such that water displaces the air in the at least one tank via water entering the at least one tank through the opening located on the bottom side of the at least one tank, thereby causing the second end of the frame to sink while the first end of the frame remains floating, and then removing air pressure from the at least one tank positioned at the first end of the frame such that water displaces the air in the at least one tank via water entering the at least one tank through the opening located on the bottom side of the at least one tank, thereby causing first end of the frame to sink.

16. The method of claim 14, wherein the frame has a generally rectangular shape, wherein the apparatus comprises four tanks, and wherein each tank is positioned at one corner of the frame such that two tanks are positioned at the first end of the frame and two tanks are positioned at the second end of the frame.

17. The method of claim 14, wherein the apparatus further comprises a manifold configured to supply air to each of the plurality of tanks.

18. The method of claim 14, wherein the opening located on the bottom side of each tank is offset from the center of the tank.

19. The method of claim 14, wherein the air supply line connected to each tank is connected to a top side of each tank.

* * * * *